(12) United States Patent
Fleizach et al.

(10) Patent No.: US 10,535,283 B2
(45) Date of Patent: Jan. 14, 2020

(54) TRANSMISSION SECURITY METHOD USING BOUNDED ARBITRARY FREQUENCY MODULATION

(71) Applicant: SPAWAR Systems Center Pacific, San Diego, CA (US)

(72) Inventors: Gregory K. Fleizach, San Diego, CA (US); Barry Hunt, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 371 days.

(21) Appl. No.: 15/708,932

(22) Filed: Sep. 19, 2017

(65) Prior Publication Data

US 2019/0088165 A1    Mar. 21, 2019

(51) Int. Cl.
*H04L 27/00* (2006.01)
*G09C 1/00* (2006.01)
*H04K 1/00* (2006.01)

(52) U.S. Cl.
CPC ............... *G09C 1/00* (2013.01); *H04K 1/003* (2013.01)

(58) Field of Classification Search
CPC .................................. G09C 1/00; H04K 1/003
USPC ......................................................... 375/259
See application file for complete search history.

(56) References Cited

U.S. PATENT DOCUMENTS

| | | |
|---|---|---|
| 7,308,043 B1 | 12/2007 | Frank |
| 8,175,134 B1 | 5/2012 | Giallorenzi et al. |
| 8,428,100 B2 | 4/2013 | Franceschini et al. |
| 9,048,938 B2 | 6/2015 | Hiscock |
| 9,319,098 B2 | 4/2016 | Hiscock |
| 2005/0226312 A1 | 10/2005 | Koslar et al. |
| 2007/0087756 A1* | 4/2007 | Hoffberg ............ G06Q 10/0631 455/450 |
| 2010/0317420 A1* | 12/2010 | Hoffberg ............ G06Q 30/0207 463/1 |

* cited by examiner

*Primary Examiner* — Don N Vo
(74) *Attorney, Agent, or Firm* — Naval Information Warfare Center, Pacific; Kyle Eppele

(57) ABSTRACT

A transmitter includes: a data providing component that provides data to be transmitted; a transforming component that generates transformed data based on the data to be transmitted; and a transmitting component that transmits the transformed data. The transforming component includes a modulator, a code generator and a data structure having stored therein a first mathematical function. The first mathematical function includes a primary first function term. The primary first function term includes a first parameter within a predetermined first delineated boundary of parameters. The code generator generates coded data so as to form an error-detecting code from the data to be transmitted. The modulator modulates the coded data with the primary first function term.

20 Claims, 8 Drawing Sheets

FIG. 4

TRANSMISSION SECURITY METHOD USING BOUNDED ARBITRARY FREQUENCY MODULATION

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 3600, San Diego, Calif., 92152; telephone (619) 553-5118; email: ssc_pac_t2@navy.mil. Reference Navy Case No. 103,287.

BACKGROUND OF THE INVENTION

Embodiments of the invention relate to secure transmission of signals.

Transmissions of signals between a transmitter and receiver are often processed to disguise the signal or prevent the signal from being received by an adversarial receiver. Prior-art methods of processing signals include frequency hopping, pulse shaping, direct sequence spread spectrum (DSSS), and encryption. A disadvantage of such methods is that they require additional equipment which may be costly and complicated. Another disadvantage is that information about the processing method, such as security keys or codebooks, must be shared between transmitter and receiver before or during transmission.

There exists a need for a system for securing signal transmission that does not rely on an exchange of security information between transmitter and receiver.

SUMMARY OF THE INVENTION

Aspects of the present invention are drawn to a system for securely transmitting signals using bounded arbitrary frequency modulation.

An aspect of the present invention is drawn to a transmitter that includes: a data providing component that provides data to be transmitted; a transforming component that generates transformed data based on the data to be transmitted; and a transmitting component that transmits the transformed data. The transforming component includes a modulator, a code generator and a data structure having stored therein a first mathematical function. The first mathematical function includes a primary first function term. The primary first function term includes a first parameter within a predetermined first delineated boundary of parameters. The code generator generates coded data so as to form an error-detecting code from the data to be transmitted. The modulator modulates the coded data with the primary first function term.

BRIEF DESCRIPTION OF THE DRAWINGS

The accompanying drawings, which are incorporated in and form a part of the specification, illustrate example embodiments and, together with the description, serve to explain the principles of the invention. In the drawings.

DETAILED DESCRIPTION OF THE EMBODIMENTS

The present invention provides a system for securely transmitting signals using bounded arbitrary frequency modulation.

The transmission of signals from a transmitter to one or more receivers is an integral part of communications, network, and broadcast systems. Signals, which may be carried on wired or wireless channels, are often processed before transmission to yield specific power and frequency characteristics. Signals may also be processed to disguise or hide them, making them less vulnerable to detection by adversarial receivers.

Many prior-art methods exist for increasing the security of a transmitted signal. DSSS multiplies the signal with a pseudorandom sequence of bits, which spreads the transmitted signal's energy over a broader frequency range, but also requires the receiver to know the exact pseudorandom sequence. Frequency hopping varies the frequency of the transmitted signal according to a pre-determined sequence; the receiver must also be aware of this sequence. Pulse shaping can reduce the ability of adversarial receivers to detect the signal with cyclostationary processing, but in turn requires a higher level of performance from the friendly receiver. Encryption can scramble the signal, but requires keys to be exchanged between transmitter and receiver.

The invention adds security to transmitted signals by modulating the signal with an arbitrary waveform. The waveform may be generated by any number of mathematical functions whose parameters are selected from a bounded range. The receiver attempts to decode the received signal using the same mathematical function; if the decoding process is unsuccessful, the receiver re-runs the decoding process using different values of the parameters.

A system that adds security to transmitted signals by applying bounded arbitrary frequency modulation will now be discussed with reference to FIGS. 1A-9 in accordance with aspects of the present invention.

FIGS. 1A-2B illustrate two different types of frequency modulation waveforms in accordance with aspects of the present invention.

FIGS. 1A-D illustrate sinusoidal frequency modulation waveforms in accordance with aspects of the present invention.

Sinusoidal frequency modulation may be described by $$e^{j2\pi \sum_n A_n \sin 2\pi f_n t^{k_n}} \tag{1}$$

where any or all of $A_n$, $f_n$, and $k_n$ may be randomly selected from a given range in some distribution. Non-limiting examples of equation (1) are $$e^{j2\pi \; 100 \sin 2\pi 0.5 t + 200 \sin 2\pi 0.1 t} \tag{2}$$

and $$e^{j2\pi \; 50 \sin 2\pi 0.4 t + 200 \sin 2\pi 0.1 t^5} \tag{3}$$

Figure 1A:
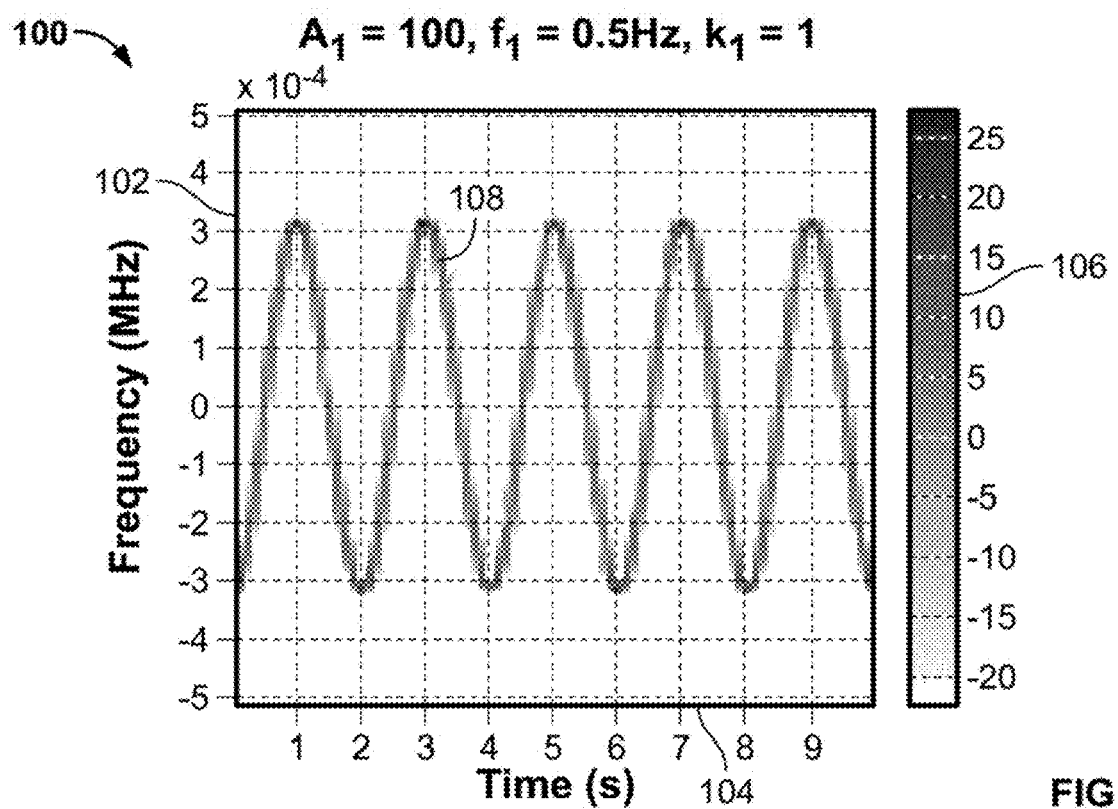
FIGS. 1A-D illustrate sinusoidal frequency modulation waveforms in accordance with aspects of the present invention.

FIG. 1A includes a graph 100, having a y-axis 102, an x-axis 104, a key 106 and a function 108. Y-axis 102 is frequency in MHz, x-axis 104 is time in seconds and key 106 is signal intensity in dB. Function 108 is waveform for a single sinusoidal function of equation (1), where $A_1=100$, $f_1=0.5$ Hz, and $k_1=1$. By including another sinusoidal function in equation (1), a resultant function changes from that of FIG. 1A.

Figure 1B:
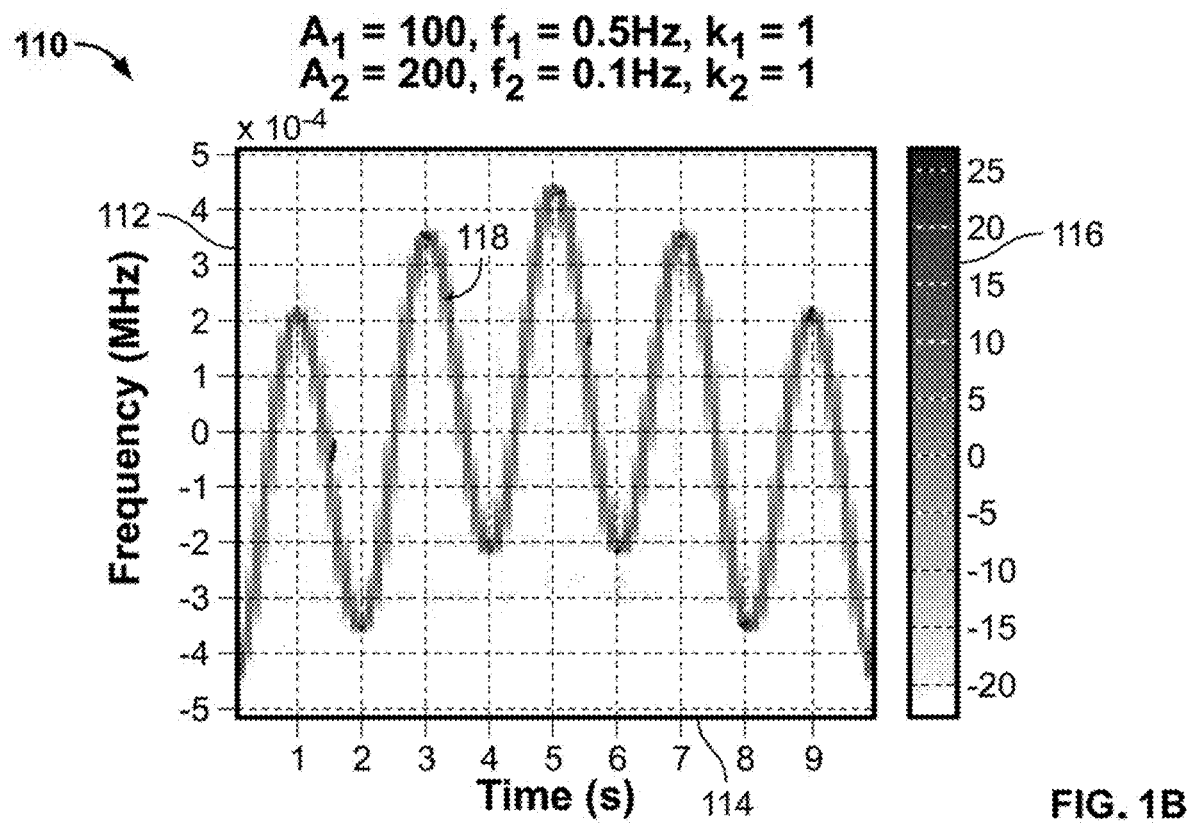

FIG. 1B includes a graph 110, having a y-axis 112, an x-axis 114, a key 116 and a function 118. Y-axis 112 is frequency in MHz, x-axis 114 is time in seconds and key 116 is signal intensity in dB. Function 118 is waveform for two sinusoidal functions of equation (1), where $A_1=100$, $f_1=0.5$ Hz, and $k_1=1$ and $A_2=200$, $f_2=0.1$ Hz, and $k_2=1$. In this example, the first function has a different amplitude parameter A value from the second function and the first function has a different frequency parameter f value from the second function. However, in this example, the first function has the same exponential parameter k value as the second function.

Figure 1C:
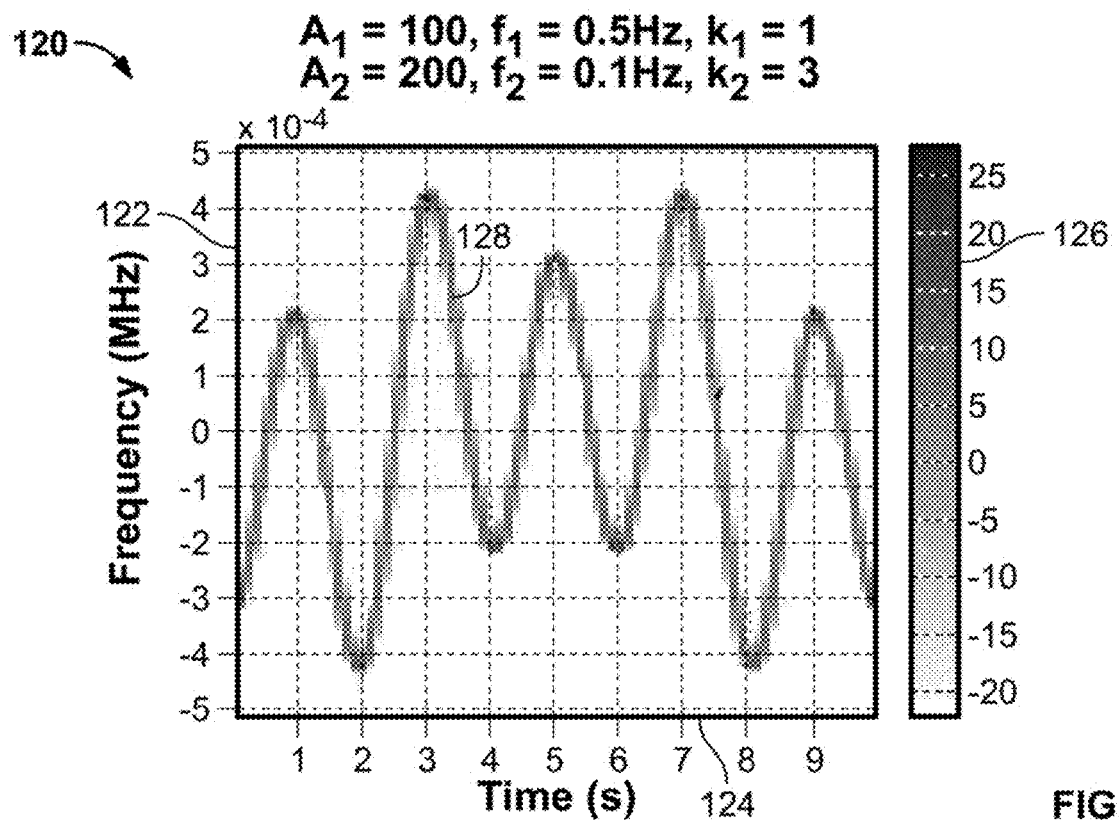

FIG. 1C includes a graph 120, having a y-axis 122, an x-axis 124, a key 126 and a function 128. Y-axis 122 is frequency in MHz, x-axis 124 is time in seconds and key 126 is intensity in dB. Function 128 is waveform for two sinusoidal functions of equation (1), where $A_1=100$, $f_1=0.5$ Hz, and $k_1=1$ and $A_2=200$, $f_2=0.1$ Hz, and $k_2=3$. In this example, the first function and the second function each have different amplitude parameter A values, different frequency parameter f values and different exponential parameter k values. Further, the second function of function 128 differs from the second function of function 118 in the exponential parameter k values. In particular, the second function of function 128 has an exponential parameter k value of 3, whereas the second function of function 118 has an exponential parameter k value of 1. This small difference provides a drastic difference between function 118 and function 128.

Figure 1D:
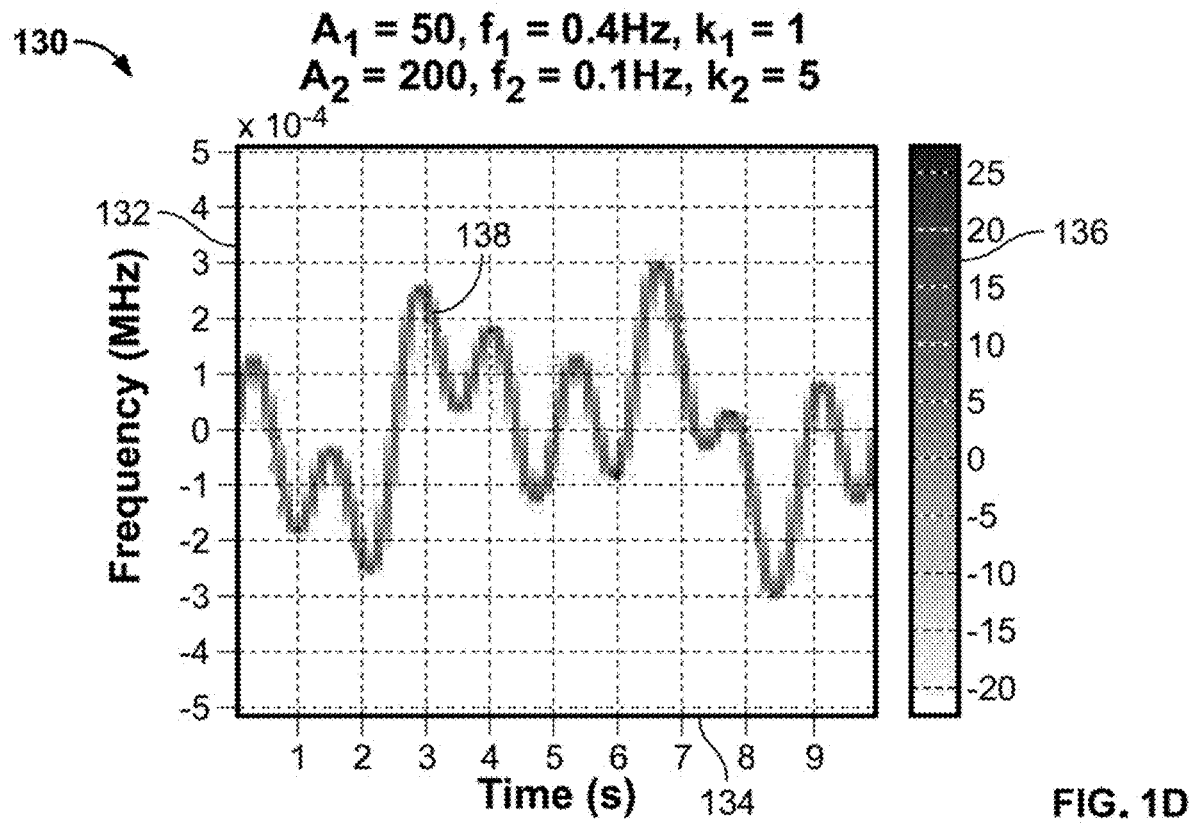

FIG. 1D includes a graph 130, having a y-axis 132, an x-axis 134, a key 136 and a function 138. Y-axis 132 is frequency in MHz, x-axis 134 is time in seconds and key 136 is signal intensity in dB. Function 138 is waveform for two sinusoidal functions of equation (1), where $A_1=50$, $f_1=0.4$ Hz, and $k_1=1$ and $A_2=200$, $f_2=0.1$ Hz, and $k_2=5$. In this example, the first function and the second function each have drastically different amplitude parameter A values, different frequency parameter t values and different exponential parameter k values.

FIGS. 1A-D show that a wide variety of waveforms can be generated by changing a small number of parameters of a sinusoidal function. It should be noted that adding additional sinusoidal functions with respective parameters will provide even more complicated resultant functions in accordance with equation (1). A different frequency modulation function will now be discussed with reference to FIGS. 2A-B.

Figure 2A:
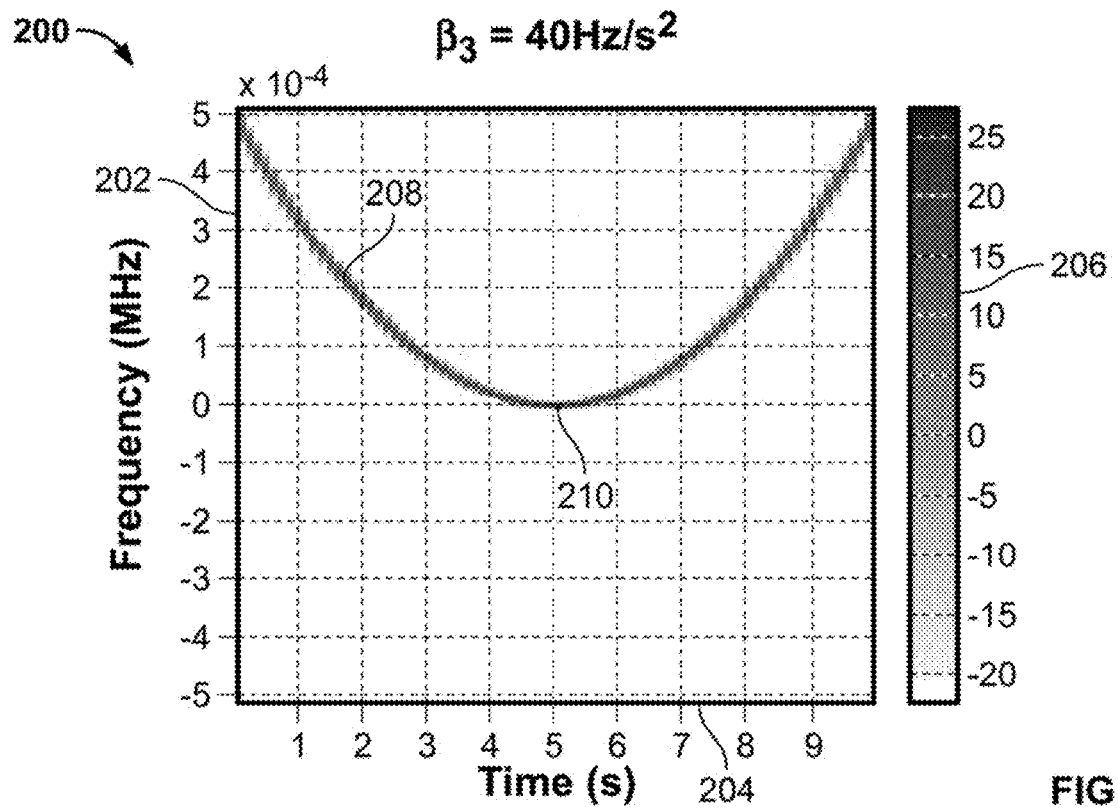
FIGS. 2A-B illustrate polynomial frequency modulation waveforms in accordance with aspects of the present invention.
Figure 2B:
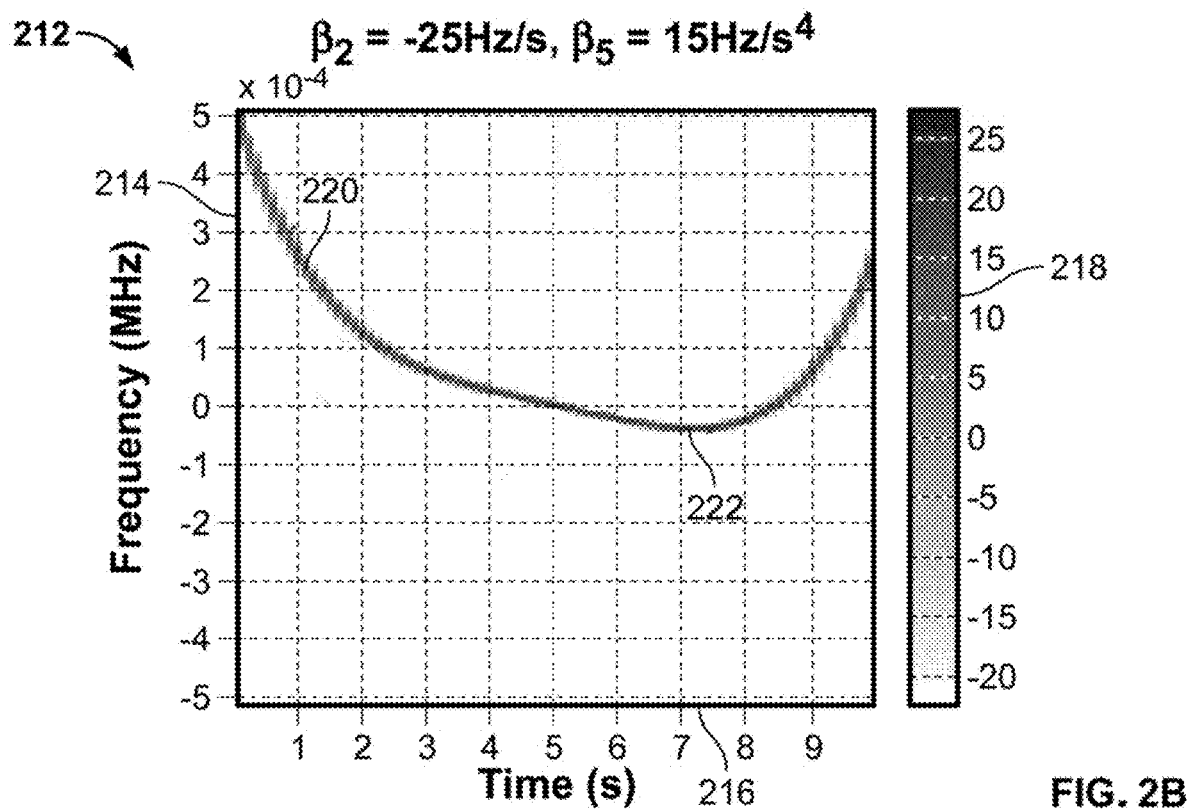

FIGS. 2A-B illustrate polynomial frequency modulation waveforms in accordance with aspects of the present invention.

Polynomial frequency modulation may be described by $$e^{j2\pi \left( \sum_n \frac{\beta_n}{n!} t^n \right)} \tag{4}$$

where $\beta_n$ may be randomly selected from a given range in some distribution. For $n=1$, equation (4) reduces to a constant frequency modulation, also known as a frequency shift. For $n=2$, equation (4) reduces to a linear frequency modulation, also known as a chirp. Non-limiting examples of equation (4) include $$e^{j2\pi \left( \frac{\beta_3}{3!} t^3 \right)} \text{ and} \tag{5}$$

$$e^{j2\pi \left( \frac{\beta_2}{2!} t^2 + \frac{\beta_5}{5!} t^5 \right)}. \tag{6}$$

FIG. 2A includes a graph 200, having a y-axis 202, an x-axis 204, a key 206 and a function 208. Y-axis 202 is frequency in MHz, x-axis 204 is time in seconds and key 206 is intensity in dB. Function 208 is waveform for a single polynomial function of equation (4) where $\beta_3=40$ Hz/s². Function 208 has a generally parabolic shape with a minimum at 5 seconds as indicated by point 210.

FIG. 2B includes a graph 212, having a y-axis 214, an x-axis 216, a key 218 and a function 220. Y-axis 214 is frequency in MHz, x-axis 216 is time in seconds and key 218 is the intensity in dB. Function 220 is waveform for two polynomial functions of equation (4) where $\beta_2=-25$ Hz/s and $\beta_5=15$ Hz/s⁴. In this example, the first function has a different exponential amplitude parameter β value from the second function. It is clear from the figure, that function 220 does not resemble a parabolic shape, and has a minimum at approximately 7.5 seconds as indicated by point 222.

FIGS. 2A-B show that different waveforms can be generated by changing a small number of parameters of a polynomial function. It should be noted that adding additional polynomial functions with respective parameters will provide even more complicated resultant functions in accordance with equation (4).

A system and method for securely transmitting signals using arbitrary frequency modulation in accordance with aspects of the present invention will now be discussed with reference to FIGS. 3-5.

Figure 3:
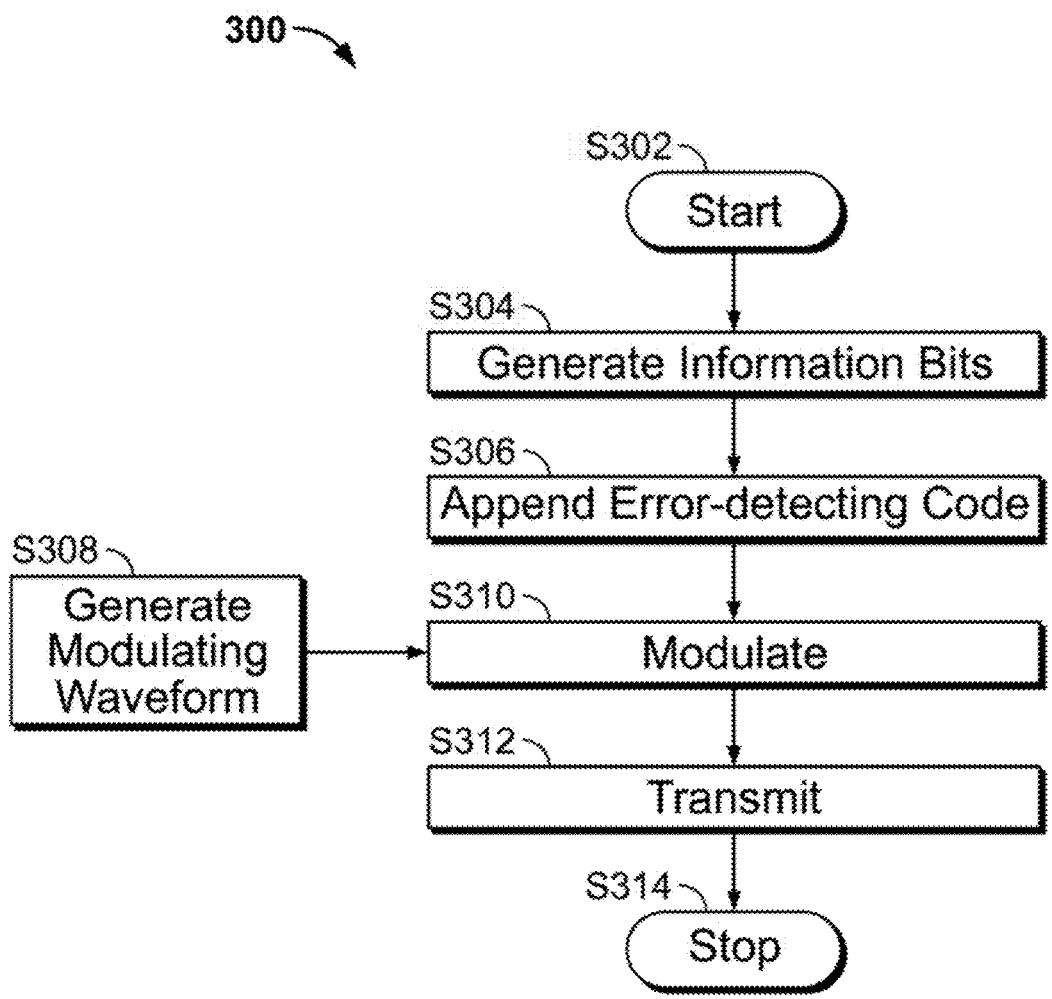
FIG. 3 illustrates a method for transmitting a signal using arbitrary frequency modulation in accordance with aspects of the present invention.

FIG. 3 illustrates a method 300 for transmitting a signal using arbitrary frequency modulation in accordance with aspects of the present invention.

As shown in the figure, method 300 starts (S302) and information bits are generated (S304). This will be described in greater detail with reference to FIG. 4.

Figure 4:
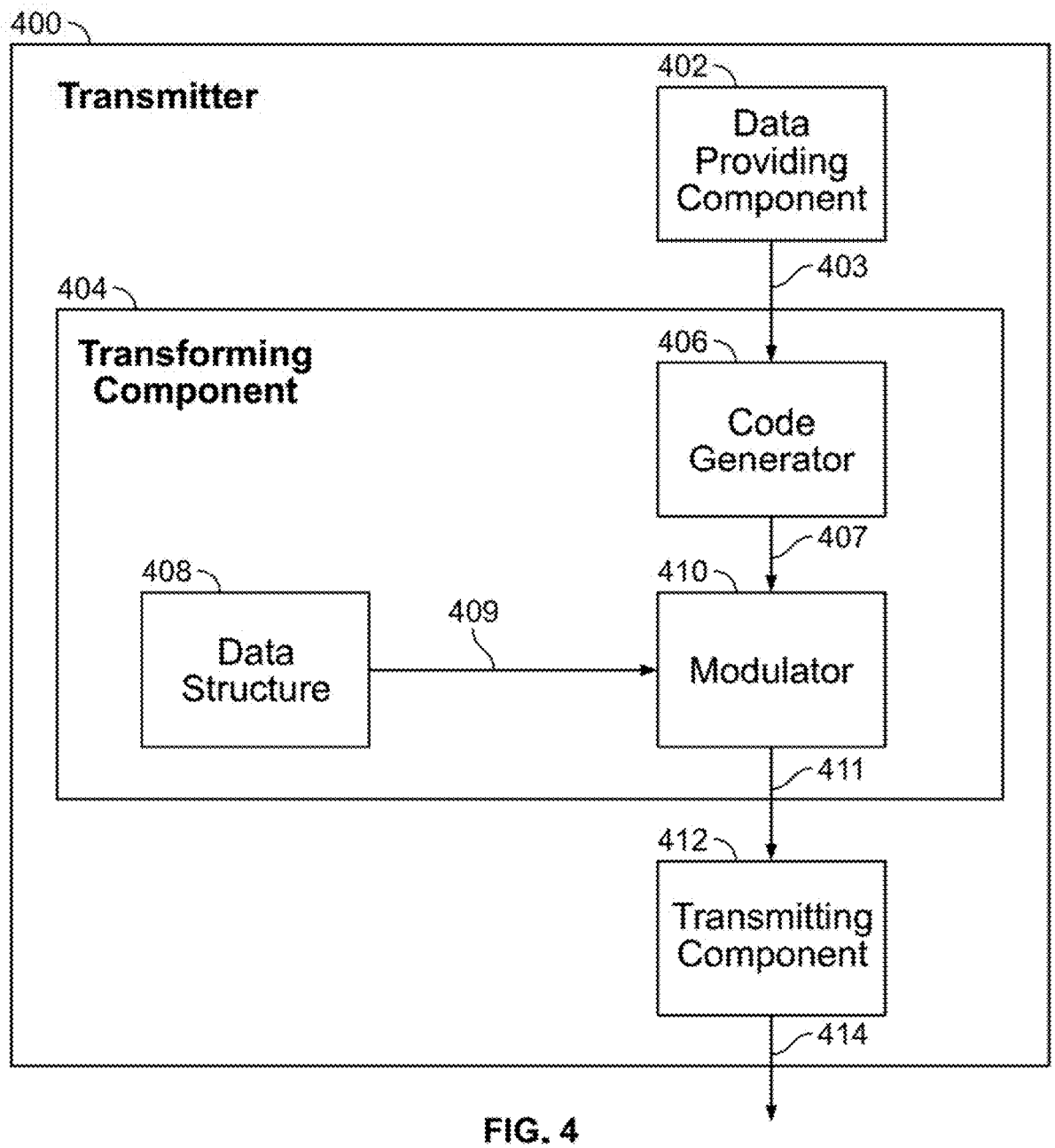
FIG. 4 illustrates an arbitrary frequency modulation transmitter in accordance with aspects of the present invention.

FIG. 4 illustrates an arbitrary frequency modulation transmitter 400 in accordance with aspects of the present invention.

As shown in the figure, transmitter 400 contains a data providing component 402, a transforming component 404, a transmitting component 412, and a communications channel 414. Transforming component 404 contains a code generator 406, a data structure 408, and a modulator 410.

Data providing component 402 may be any device or system that contains or generates information bits that need to be transmitted from one location to another. Non-limiting examples of data providing component 402 are computers on a network or telephone calls.

Code generator 406 may be any device or system that creates and appends an error-detecting code to information bits 403 to create coded data 407 which is provided by data providing component 402. Coded data 407 includes a check value so as to form an error-detecting code from information bits 403. Non-limiting examples of code generator 406 include a cyclic-redundancy check (CRC) method or the secure hash algorithm (SHA).

Data structure 408 may be any device or system that provides a modulating signal based on stored mathematical functions. In this non-limiting example, data structure 408 provides modulating signals generated by stored sinusoidal or polynomial functions whose parameters are selected from a bounded range of values.

Modulator 410 may be any device or system that mixes, or modulates, one signal with another. In this non-limiting example, modulator 410 modulates coded data 407 with modulating signal 409. In another non-limiting example, modulator 410 also applies DSSS to further spread the frequency characteristics of coded data 407.

Transmitting component 412 may be any device or system that converts a digital signal into an analog signal that can be sent over communications channel 414. In this non-limiting example, transmitting component 412 takes transformed signal 411, which is a digital data stream, and converts it into a radio-frequency signal to be transmitted over the air.

In this non-limiting embodiment, data providing component 402, code generator 406, data structure 408, modulator 410, and transmitting component 412 are shown as separate components. In other example embodiments, at least two of data providing component 402, code generator 406, data structure 408, modulator 410, and transmitting component 412 may be the same component. Further, in some embodiments, at least one of data providing component 402, code generator 406, data structure 408, modulator 410, and transmitting component 412 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

In operation, data providing component 402 generates information bits 403.

Returning to FIG. 3, after the information bits are generated (S304), error-detecting code is appended (S306). For example, returning to FIG. 4, code generator 406 generates and appends an error-detecting code to create coded data 407.

Returning to FIG. 3, after the error-detecting code is appended (S306), a modulating waveform is generated (S308). For example, returning to FIG. 4, data structure 408 selects a set of values from a delineated boundary of parameters and generates modulating signal 409 using a stored mathematical function. This will be described in greater detail with reference to FIG. 5.

Figure 5:
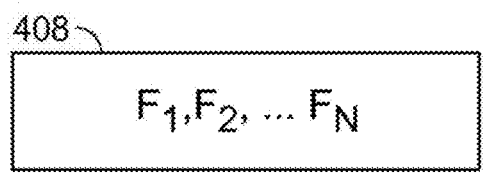
FIG. 5 illustrates an example data structure component within the arbitrary frequency modulation transmitter of FIG. 4.

FIG. 5 illustrates an example of data structures 408 in accordance with aspects of the present invention.

As shown in the figure, transmitter data structure 408 contains arbitrary mathematical functions whose parameters are selected from a delineated boundary of values. Non-limiting example embodiments of arbitrary mathematical functions are sinusoidal functions described by equation (1) and/or polynomial functions described by equation (4).

In particular, consider the situation wherein a modulation scheme is chosen using a sinusoidal function of equation (1). In such a situation, there are predetermined parameters that are chosen, wherein each parameter lies within a predetermined delineated boundary of parameters. From equation (1), the parameters include: n, $A_n$, $f_n$, and $k_n$. The values of each parameter may be chosen by known methods, non-limiting examples of which include a priori determination, pseudo-random generation and combinations thereof.

For purposes of discussion, suppose that n, the parameter of integer number of functional terms within the mathematical function of equation (1), has a delineated boundary of [1,4]. This means that the function from equation (1), which will be used to modulate the information bits, may have a possible of 1-4 integer function terms.

Further, for purposes of discussion, suppose that $A_n$, the amplitude parameter of functional terms within the mathematical function of equation (1), has a delineated boundary of [0.1,10], with incremental steps of 0.1. This means that each function term from equation (1), which will be used to modulate the information bits, may have a possible of 100 amplitude multipliers.

Further, for purposes of discussion, suppose that $f_n$, the frequency parameter of functional terms within the mathematical function of equation (1), has a delineated boundary of [0.1,1.0] Hz, with incremental steps of 0.1. This means that each function term from equation (1), which will be used to modulate the information bits, may have a possible of 10 frequency multipliers.

Further, for purposes of discussion, suppose that $k_n$, the exponential parameter of functional terms within the mathematical function of equation (1), has a delineated boundary of [1,5], with incremental steps of 0.1. This means that each function term from equation (1), which will be used to modulate the information bits, may have a possible of 40 exponents.

Now, consider the situation wherein a modulation scheme is chosen using a polynomial function of equation (4). Again, there are parameters that are chosen, wherein each parameter lies within a predetermined delineated boundary of parameters. From equation (1), the parameters include: n and $\beta_n$. The values of each parameter may be chosen by known methods, non-limiting examples of which include a priori determination, pseudo-random generation and combinations thereof.

Again, for purposes of discussion, suppose that n, the parameter of integer number of functional terms within the mathematical function of equation (4), has a delineated boundary of [1,4]. This means that the function from equation (4), which will be used to modulate the information bits, may have a possible of 1-4 integer function terms.

Further, for purposes of discussion, suppose that $\beta_n$, the amplitude parameter of functional terms within the mathematical function of equation (1), has a delineated boundary of [−50,50] Hz, with incremental steps of 1 Hz. This means that each function term from equation (4), which will be used to modulate the information bits, may have a possible of 100 frequency multipliers.

Still further, in some embodiments, a combination of sinusoidal functions described by equation (1) and polynomial functions described by equation (4) may be used. In such embodiments, the parameters of each function term may be assigned by known methods.

Returning to FIG. 3, after the modulating waveform is generated (S308), the information and appended error-detecting code is modulated (S310). For example, returning to FIG. 4, modulator 410 mixes coded data 407 and modulating signal 409.

Returning to FIG. 3, after the information and error-detecting code is modulated (S310), the signal is transmitted (S312). For example, returning to FIG. 4, transmitting component 412 transmits transformed signal 411 over communications channel 414.

Returning to FIG. 3, after the signal is transmitted (S312), method 300 stops (S314).

After transmitter 400 modulates a data stream with an arbitrary frequency waveform whose shape is determined by a bounded set of parameters. A system and method for receiving and decoding this frequency modulated signal will now be discussed with reference to FIGS. 6-8.

Figure 6:
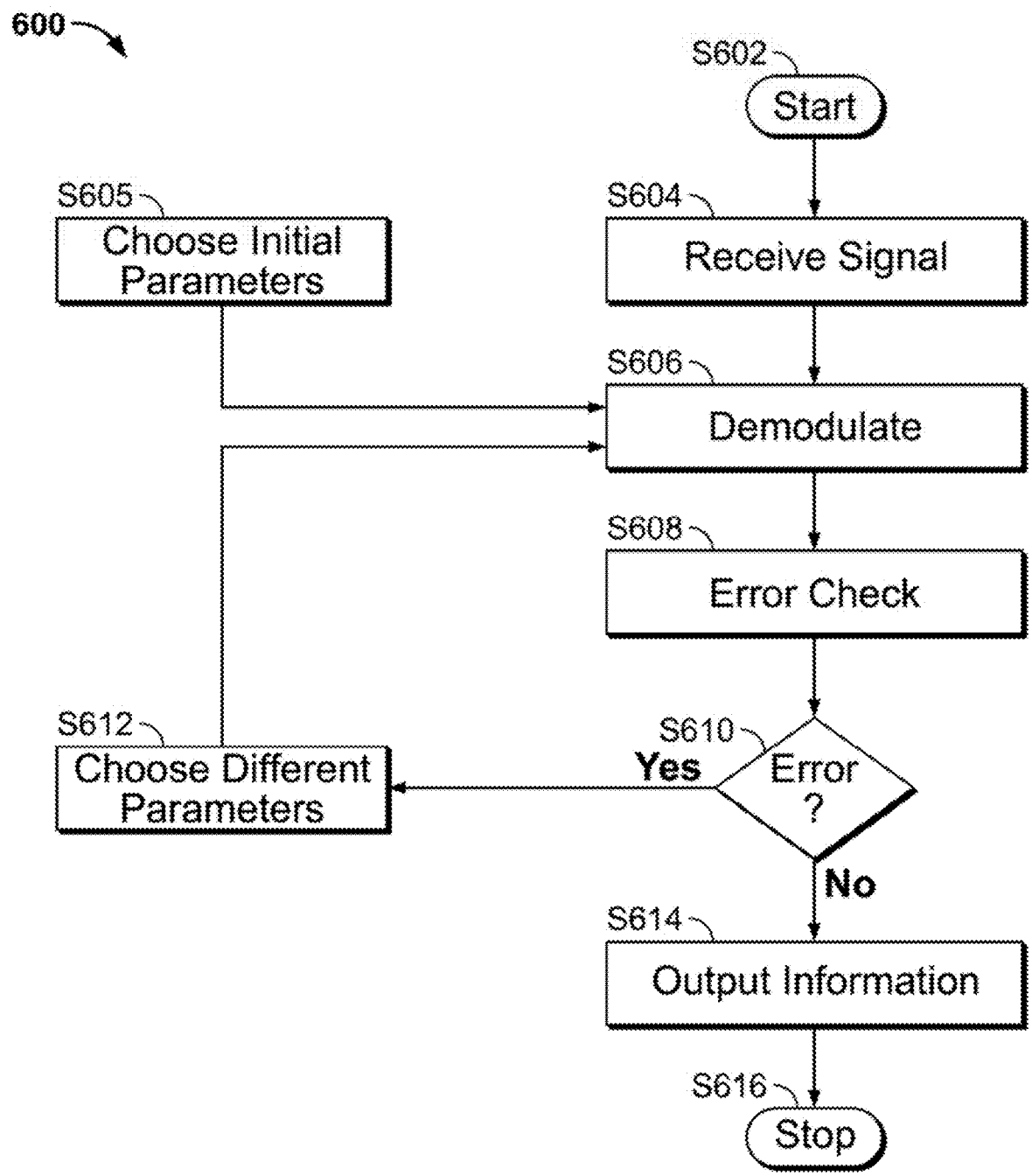
FIG. 6 illustrates a method for receiving a signal using arbitrary frequency modulation in accordance with aspects of the present invention.

FIG. 6 illustrates a method 600 for receiving a signal using arbitrary frequency modulation in accordance with aspects of the present invention.

As shown in the figure, method 600 starts (S602) and a signal is received (S604). This will be described in greater detail with reference to FIG. 7.

Figure 7:
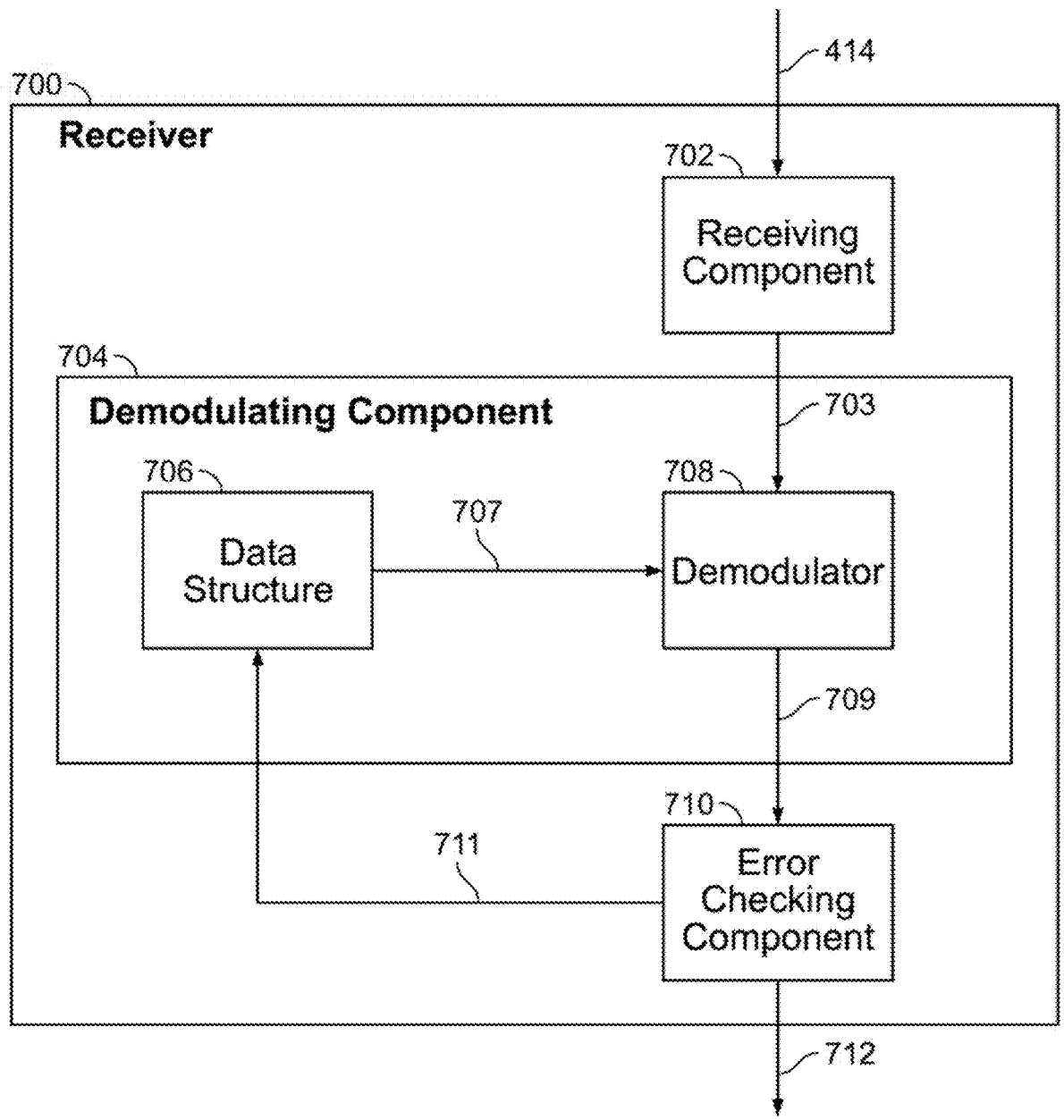
FIG. 7 illustrates an arbitrary frequency modulation receiver in accordance with aspects of the present invention.

FIG. 7 illustrates arbitrary frequency modulation receiver 700 in accordance with aspects of the present invention.

As shown in the figure, receiver 700 contains a receiving component 702, a demodulating component 704, and an error checking component 710. Demodulating component 704 contains a data structure 706 and a demodulator 708. Receiver 700 receives signals from communications channel 414, processes the signals, and outputs information bits 712.

Receiving component 702 may be any device or system that converts signals received over communications channel 414 into digital data. In this non-limiting example, receiving component 702 converts a radio-frequency analog signal into transformed digital data 703.

Data structure 706 may be any device or system that provides a modulating signal based on stored mathematical functions. In this non-limiting example, data structure 706 provides modulating signal 707 generated by stored sinusoidal or polynomial functions whose parameters are selected from a bounded range of values.

Demodulator 708 may be any device or system that extracts a signal from a second signal by mixing, or multiplying, the second signal with a third signal. In this non-limiting example, demodulator 708 extracts demodulated signal 709 by mixing transformed data 703 with modulating signal 707.

Error checking component 710 may be any device or system that determines whether a signal contains errors. Non-limiting examples of error checking component 710 include CRC codes or SHA.

In this non-limiting example, receiving component 702, data structure 706, demodulator 708, and error checking component 710 are shown as separate components. In other example embodiments, at least two of receiving component 702, data structure 706, demodulator 708, and error checking component 710 may be the same component. Further, in some embodiments, at least one of receiving component 702, data structure 706, demodulator 708, and error checking component 710 may be implemented as a computer having tangible computer-readable media for carrying or having computer-executable instructions or data structures stored thereon.

In operation, receiving component 702 receives the signal over communications channel 414. Receiving component 702 converts the received signal into transformed digital data 703. Receiver 700 knows that transformed data 703 has been modulated with the same mathematical functions stored in transmitter 400, but the exact parameters used may be unknown.

Returning to FIG. 6, after the signal is received (S604), initial parameters are chosen (S605). For example, returning to FIG. 7, data structure 706 chooses an initial set of parameters and generates modulating signal 707. Data structure 706 generates a waveform based on stored mathematical functions with bounded sets of parameters.

Receiver 700 receives a signal that is modulated with an arbitrary frequency waveform and decodes information bits 712. The decoding process is based on a priori knowledge of the arbitrary mathematical function and bounded sets of parameters stored in transmitter 400, but not the exact parameters used. The arbitrary mathematical functions and bounded sets of parameters will now be discussed with reference to FIG. 8.

Figure 8:
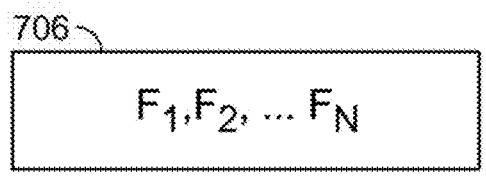
FIG. 8 illustrates an example data structure component within the arbitrary frequency modulation receiver of FIG. 7.

FIG. 8 illustrates data structure 706 in accordance with aspects of the present invention.

As shown in the figure, receiver data structure 706 contains the same mathematical functions with the same bounded range of parametric values as transmitter data structure 408. Aside from an initial agreement on mathematical functions and parameters, there is no other exchange of information between transmitter 400 and receiver 700. A non-limiting example is that transmitter 400 and receiver 700 both use sinusoidal frequency modulation with the following set of parameters: $A_1$=[−1, 0.25, 1], $f_1$=[−100, −50, −25], $k_1$=[0, 1], $A_2$=[10], $f_2$=[0, 15], $k_2$=[2, 3]. The product of the lengths of each set yields 72 possible choices. Transmitter 400 chooses one waveform with parameters $A_1$=1, $f_1$=−50, $k_1$=1, $A_2$=10, $f_2$=15, and $k_2$=2. Receiver 700 attempts to decode the received signal by iterating through the 72 possible choices until correct decoding has occurred.

Returning to FIG. 6, after the initial parameters are chosen (S605), the received signal is demodulated (S606). For example, returning to FIG. 7, demodulator 708 mixes transformed data 703 with modulating signal 707 and extracts demodulated data 709.

Returning to FIG. 6, after the received signal is demodulated (S606), it is checked for error (S608). For example, returning to FIG. 7, error checking component 710 then checks for errors.

Returning to FIG. 6, after the demodulated signal is checked for error (S604), if there are errors (yes at S610), then different parameters are chosen (S612). For example, returning to FIG. 7, data structure 706 chooses another set of parameters and generates another modulating signal 707. If there are errors, then error signal 711 is sent to data structure 706. Data structure 706 generates a different modulating signal 707 based on different parametric values. Demodulator 708 generates other demodulated data 709, which is subsequently checked by error checking component 710. Receiver 700 continues to demodulate, error check and choose different parameters (S606, S608, S610, and S612) until the error rate meets or exceeds a pre-determined error rate specification for receiver 700.

Returning to FIG. 6, after the demodulated signal is checked for error (S604), if there are no errors (no at S610), then the information is output (S614). For example, returning to FIG. 7, receiver 700 then outputs information bits 712.

Returning to FIG. 6, after the information is output (S614), method 600 stops (S616).

In short, the data to be transmitted (in conjunction with error codes added thereto) are modulated with at least one mathematical function. The mathematical function can be derived from equation (1), equation (4) or a combination of both.

For purposes of discussion, consider the situation wherein the data to be transmitted is modulated with a first mathematical function derived from equation (1) and a second mathematical function derived from equation (4). Further, suppose that the first mathematical function includes two terms, for purposes of discussion: a primary first function term, e.g., one derived from equation (2); and a secondary first function term, e.g., one derived from equation (3). Still further, suppose that the second mathematical function includes two terms, for purposes of discussion: a primary second function term, e.g., one derived from equation (5); and a secondary second function term, e.g., one derived from equation (6). In this manner, all the parameters associated with the function terms are generated by data structure 408. Each of the parameters have an associated predetermined delineated boundary as discussed above. As such, receiver 700 need only choose parameters within the delineated boundary for the first mathematical function. If the chosen parameters are not the same parameters as chosen by data structure 408, then an error will be detected. In such a case, a new set of parameters are chosen. This loop continues until the correct parameters are chosen by receiver 700.

It should be noted that in this example embodiment, receiver 700 demodulates, error checks and chooses different parameters (S606, S608, S610, and S612) as a single loop with each iteration being performed serially. In another example embodiment, there may be multiple loops wherein a receiver demodulates, error checks and chooses different parameters (S606, S608, S610, and S612) in parallel.

FIGS. 3-8 illustrate a system and method for transmitting and receiving signals using bounded arbitrary frequency modulation. A more specific example embodiment will now be discussed with reference to FIG. 9.

Figure 9:
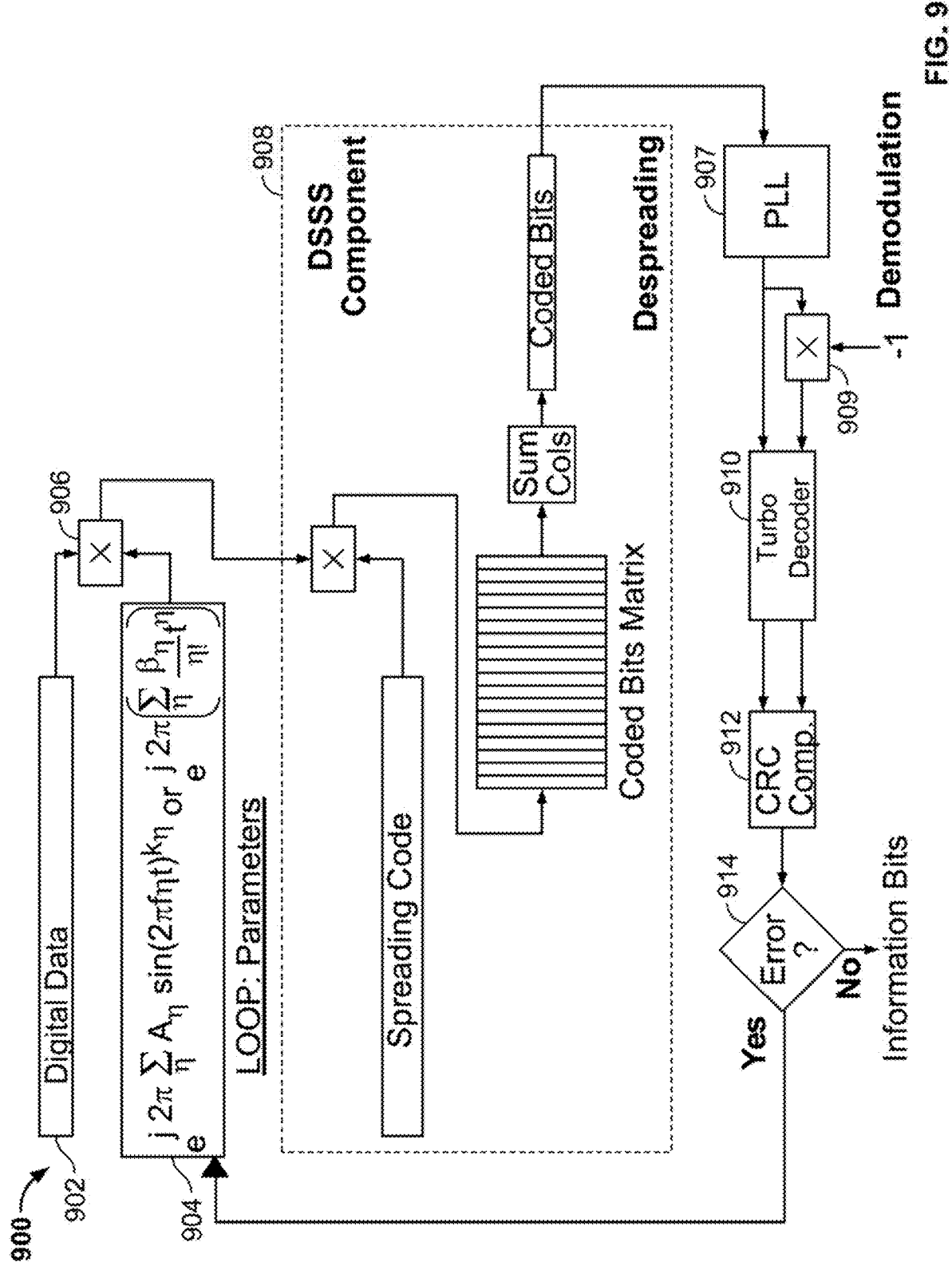
FIG. 9 illustrates an example embodiment of a receiver in accordance with aspects of the present invention.

FIG. 9 illustrates an example embodiment of a bounded arbitrary frequency modulation receiver in accordance with aspects of the present invention.

As shown in the figure, receiver 900 includes received data 902, data structure 904, demodulator 906, a phase-locked loop (PLL) 907, an inverter 909, DSSS component 908, turbo decoder 910, CRC component 912, and error checking component 914.

Received data 902 is digital data after being acquired and digitized from a communications channel. Data structure 904 contains mathematical functions and sets of parameters used in the bounded arbitrary frequency modulation scheme. DSSS component 908 extracts underlying data that was encoded by an analogous DSSS component during transmission. Direct sequence spread spectrum coding is used to increase a signal's resistance to intentional or unintentional interference. PLL 907, inverter 909 and turbo decoder 910 together act as a demodulator to extract underlying data that was encoded by an analogous turbo encoder during transmission. Turbo decoder 910 uses turbo codes, which is a class of forward error-correcting codes that is used to improve reliability when communicating over noisy channels. Turbo coding is used in this non-limiting example because it performs very close to the Shannon limit. Since the initial phase of the incoming bits is unknown, turbo decoder 910 decodes both the original output of the PLL and its inverse.

CRC component 912 calculates CRCs for each set of decoded bits. If error checking component 914 compares the calculated CRC to the received CRC and indicates that no errors have occurred for one of the sets of decoded bits, then a correct decoding is declared and the frequency modulation parameters used in the current iteration are the correct values. Receiver 900 can declare a correct decoding with high confidence since the CRC polynomial was initially chosen to have sufficient length to protect against false CRCs from indicating a correct check. The probability of a false check is proportional to the length of the CRC. If neither of decoded bit streams passes the CRC then the whole method is iterated with a different set of parameter values in data structure 904. The method is iterated until all the possible parameter steps, covering the pre-determined range, are attempted.

In summary, the transmission of signals over a communications channel uses various techniques to prevent detection by an adversarial receiver. Prior art methods such as DSSS, frequency hopping, pulse shaping, and encryption are used to disguise the transmitted signal. However, these methods often require additional equipment at the transmitter and receiver, require that additional information such as encryption keys or spreading tables be synchronized between transmitter and receiver.

The invention presents a system for enhancing the security of transmitted signals by using bounded arbitrary frequency modulation. The invention allows for complicated and randomized modulation schemes, which is better at obfuscating a signal compared to prior-art linear frequency modulation. The invention employs contiguous modulation schemes instead of frequency hopping, which may be easily discerned with a spectrum analyzer. Due to the random nature of the modulation, the invention obscures true signal bandwidth and modulation type, which prior-art methods like DSSS or frequency hopping do not. The invention also provides constantly changing waveform characteristics without the need for updating keys or spreading tables at both transmitter and receiver.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A transmitter comprising:
  a data providing component operable to provide data to be transmitted;
  a transforming component operable to generate transformed data based on the data to be transmitted; and
  a transmitting component operable to transmit the transformed data, wherein said transforming component comprises a modulator, a code generator and a data structure having stored therein a first mathematical function,
wherein the first mathematical function includes a primary first function term,
wherein the primary first function term includes a first parameter within a predetermined first delineated boundary of parameters,
wherein said code generator is operable to append an error-detecting code to the data to be transmitted to generate coded data, and
wherein said modulator is operable to modulate the coded data with the primary first function term.

2. The transmitter of claim 1,
wherein the first mathematical function additionally includes a secondary first function term,
wherein the secondary first function term includes a second parameter within a predetermined second delineated boundary of parameters, and
wherein said modulator is further operable to modulate the coded data with one of the primary first function term and the secondary first function term.

3. The transmitter of claim 2,
wherein the primary first function term comprises a product of a primary polynomial term and the first parameter,
wherein the secondary first function term comprises a product of a secondary polynomial term and the second parameter, and
wherein the first mathematical function comprises a sum of the primary first function term and the secondary first function term.

4. The transmitter of claim 1,
wherein said data structure additionally has stored therein a second mathematical function,
wherein the second mathematical function includes a primary second function term,
wherein the primary second function term includes a third parameter within a predetermined third delineated boundary of parameters, and
wherein said modulator is operable to modulate the coded data with one of the primary first function term and the primary second function term.

5. The transmitter of claim 4,
wherein the second mathematical function additionally includes a secondary second function term,
wherein the secondary second function term includes a fourth parameter within a predetermined fourth delineated boundary of parameters, and
wherein said modulator is operable to modulate the coded data with one of the primary first function term, the primary second function term and the secondary second function term.

6. The transmitter of claim 5,
wherein the primary second function term comprises a product of a primary sinusoidal term and the third parameter,
wherein the secondary second function term comprises a product of a secondary sinusoidal term and the fourth parameter, and
wherein the second mathematical function comprises a sum of the primary second function term and the secondary second function term.

7. The transmitter of claim 6, wherein said code generator operable to generate the transformed data to include a cyclic redundancy check as the error-detecting code.

8. A method of transmitting data, said method comprising:
providing, via a data providing component, data to be transmitted;
generating, via a transforming component, transformed data based on the data to be transmitted; and
transmitting, via a transmitting component, the transformed data,
wherein said generating, via a transforming component, transformed data based on the data to be transmitted comprises generating the transformed data via a modulator, a code generator and a data structure having stored therein a first mathematical function,
wherein the first mathematical function includes a primary first function term,
wherein the primary first function term includes a first parameter within a predetermined first delineated boundary of parameters,
wherein said generating, via a transforming component, transformed data based on the data to be transmitted further comprises appending, via the code generator, an error-detecting code to the data to be transmitted to generate coded data, and
wherein said generating, via a transforming component, transformed data based on the data to be transmitted further comprises modulating, via the modulator, the coded data with the primary first function term.

9. The method of claim 8,
wherein the first mathematical function further includes a secondary first function term,
wherein the secondary first function term includes a second parameter within a predetermined second delineated boundary of parameters, and
wherein said generating, via a transforming component, transformed data based on the data to be transmitted further comprises modulating, via the modulator, the coded data with one of the primary first function term and the secondary first function term.

10. The method of claim 9,
wherein the primary first function term comprises a product of a primary polynomial term and the first parameter,
wherein the secondary first function term comprises a product of a secondary polynomial term and the second parameter, and
wherein the first mathematical function comprises a sum of the primary first function term and the secondary first function term.

11. The method of claim 8,
wherein said generating, via a transforming component, transformed data based on the data to be transmitted comprises generating the transformed data via a modulator and a data structure having additionally stored therein a second mathematical function,
wherein the second mathematical function includes a primary second function term,
wherein the primary second function term includes a third parameter within a predetermined third delineated boundary of parameters, and
wherein said generating, via a transforming component, transformed data based on the data to be transmitted further comprises modulating, via the modulator, the coded data with one of the primary first function term and the primary second function term.

12. The method of claim 11,
wherein the second mathematical function additionally includes a secondary second function term, wherein the secondary second function term includes a fourth parameter within a predetermined fourth delineated boundary of parameters, and wherein said generating, via a transforming component, transformed data based on the data to be transmitted further comprises modulating, via the modulator, the coded data with one of the primary first function term, the primary second function term and the secondary second function term.

13. The method of claim 12,
wherein the primary second function term comprises a product of a primary sinusoidal term and the third parameter,
wherein the secondary second function term comprises a product of a secondary sinusoidal term and the fourth parameter, and
wherein the second mathematical function comprises a sum of the primary second function term and the secondary second function term.

14. The method of claim 13, wherein said generating, via the code generator, the transformed data comprises generating the transformed data to include a cyclic redundancy check as the error-detecting code.

15. A method of receiving transformed data from a transmitter comprising a data providing component, a transforming component and a transmitting component, the data providing component being operable to provide data to be transmitted, the transforming component being operable to generate the transformed data based on the data to be transmitted, and the transmitting component operable to transmit the transformed data, the transforming component comprising a modulator, a code generator and a data structure having stored therein a first transmitter mathematical function, the first transmitter mathematical function including a transmitter primary first function term, the transmitter primary first function term including a transmitter first parameter within a predetermined first delineated boundary of parameters, the code generator being operable to append an error-detecting code to the data to be transmitted to generate coded data and the modulator being operable to modulate the data to be transmitted with the transmitter primary first function term, said method comprising:
receiving, via a receiving component, the transformed data;
demodulating, via a demodulating component, the received transformed data to generate a first demodulated signal;
determining, via and error checking component, whether the first demodulated signal includes an error; and
demodulating, via the demodulating component, the received transformed data to generate a second demodulated signal if the first demodulated signal includes an error,
wherein said demodulating, via a demodulating component, the received transformed data to generate the first demodulated signal comprises generating the first demodulated signal via a demodulator and a data structure having stored therein a receiver first mathematical function,
wherein the receiver first mathematical function includes a receiver primary first function term,
wherein the receiver primary first function term includes a receiver first parameter within the predetermined first delineated boundary of constants, and
wherein said demodulating, via a demodulating component, the received transformed data to generate the first demodulated signal further comprises demodulating, via the demodulator, the received transformed data with the receiver primary first function term.

16. The method of claim 15,
wherein the receiver first mathematical function further includes a receiver secondary first function term,
wherein the receiver secondary first function term includes a receiver second parameter within a predetermined second delineated boundary of parameters, and
wherein said demodulating, via a demodulating component, the received transformed data to generate the first demodulated signal further comprises demodulating, via the demodulator, the received transformed data with one of the receiver primary first function term the receiver secondary first function term.

17. The method of claim 16,
wherein the receiver primary first function term comprises a product of a receiver primary polynomial term and the receiver first parameter,
wherein the receiver secondary first function term comprises a product of a receiver secondary polynomial term and the receiver second parameter, and
wherein the receiver first mathematical function comprises a sum of the receiver primary first function term and the receiver secondary first function term.

18. The method of claim 15,
wherein said generating the first demodulated data via a demodulator and a data structure having stored therein a receiver first mathematical function further comprises generating the first demodulated signal via the demodulator and the data structure having additionally stored therein a receiver second mathematical function,
wherein the receiver second mathematical function includes a receiver primary second function term,
wherein the receiver primary second function term includes a receiver third parameter within a predetermined third delineated boundary of parameters, and
wherein said demodulating, via a demodulating component, the received transformed data to generate the first demodulated signal further comprises demodulating, via the demodulator, the received transformed data with one of the receiver primary first function term and the receiver primary second function term.

19. The method of claim 18,
wherein the receiver second mathematical function additionally includes a receiver secondary second function term,
wherein the receiver secondary second function term includes a receiver fourth parameter within a predetermined fourth delineated boundary of parameters, and
wherein said demodulating, via a demodulating component, the received transformed data to generate the first demodulated signal further comprises demodulating, via the demodulator, the received transformed data with one of the receiver primary first function term, the receiver primary second function term and the receiver secondary second function term.

20. The method of claim 19,
wherein the receiver primary second function term comprises a product of a receiver primary sinusoidal term and the receiver third parameter,
wherein the receiver secondary second function term comprises a product of a receiver secondary sinusoidal term and the receiver fourth parameter, and wherein the receiver second mathematical function comprises a sum of the receiver primary second function term and the receiver secondary second function term.

\* \* \* \* \*